United States Patent [19]

Savitsky et al.

[11] Patent Number: 5,013,122
[45] Date of Patent: May 7, 1991

[54] THREADED CRIMPING BODY FOR FIBER OPTIC TERMINATION

[75] Inventors: Wallace R. Savitsky; Ronald R. Schaffer; Gary N. Warner, all of Harrisburg, Pa.

[73] Assignee: AMP Incorporated, Harrisburg, Pa.

[21] Appl. No.: 429,676

[22] Filed: Oct. 31, 1989

Related U.S. Application Data

[63] Continuation-in-part of Ser. No. 400,303, Aug. 29, 1989.

[51] Int. Cl.$^5$ .................................................. G02B 6/26
[52] U.S. Cl. ................................ 350/96.20; 350/96.21
[58] Field of Search ................. 350/96.20, 96.21, 96.22

[56] References Cited

U.S. PATENT DOCUMENTS

| | | | |
|---|---|---|---|
| 3,946,467 | 3/1976 | Lukas et al. | 350/96.20 X |
| 4,148,557 | 4/1979 | Garvey | 350/96.20 |
| 4,198,119 | 4/1980 | Uberbacher | 350/96.20 |
| 4,355,862 | 10/1982 | Kock | 350/96.20 |
| 4,362,356 | 12/1982 | Wiliams et al. | 350/96.20 |
| 4,368,948 | 1/1983 | Desbouys | 350/96.20 |
| 4,406,515 | 9/1983 | Roberts | 350/96.21 |
| 4,440,469 | 4/1984 | Schumacher | 350/96.20 |
| 4,607,911 | 8/1986 | Rhodes | 350/96.20 |
| 4,674,833 | 6/1987 | Des Forges et al. | 350/96.21 |
| 4,679,895 | 7/1987 | Huber | 350/96.20 |
| 4,695,124 | 9/1987 | Himono et al. | 350/96.20 |
| 4,773,725 | 9/1988 | Ashman et al. | 350/96.20 |

Primary Examiner—Brian Healy

[57] ABSTRACT

A termination for optical members comprises an alignment ferrule 1 and an optical fiber member 3 having a buffer 4 and an optical fiber 2. The alignment ferrule 10 has a tubular passagway 22 for encircling the buffer 4 and the optical fiber 2, and a tip 9 with centrally disposed aperture 13 therethrough for closely receiving an end of the fiber 2 from the tubular passageway 22. The tubular passageway 22 of the alignment ferrule has a connection section with inwardly directed threads 32. The termination 7 further comprises a crimping body 8 of deformable, elastic material intimately surrounding the flexible buffer 4 and fiber 2. The crimping body 8 has a connection section 29 with outwardly directed threads 31 which engage with the inwardly directed threads 32 of the passageway 22 of ferrule 1.

5 Claims, 3 Drawing Sheets

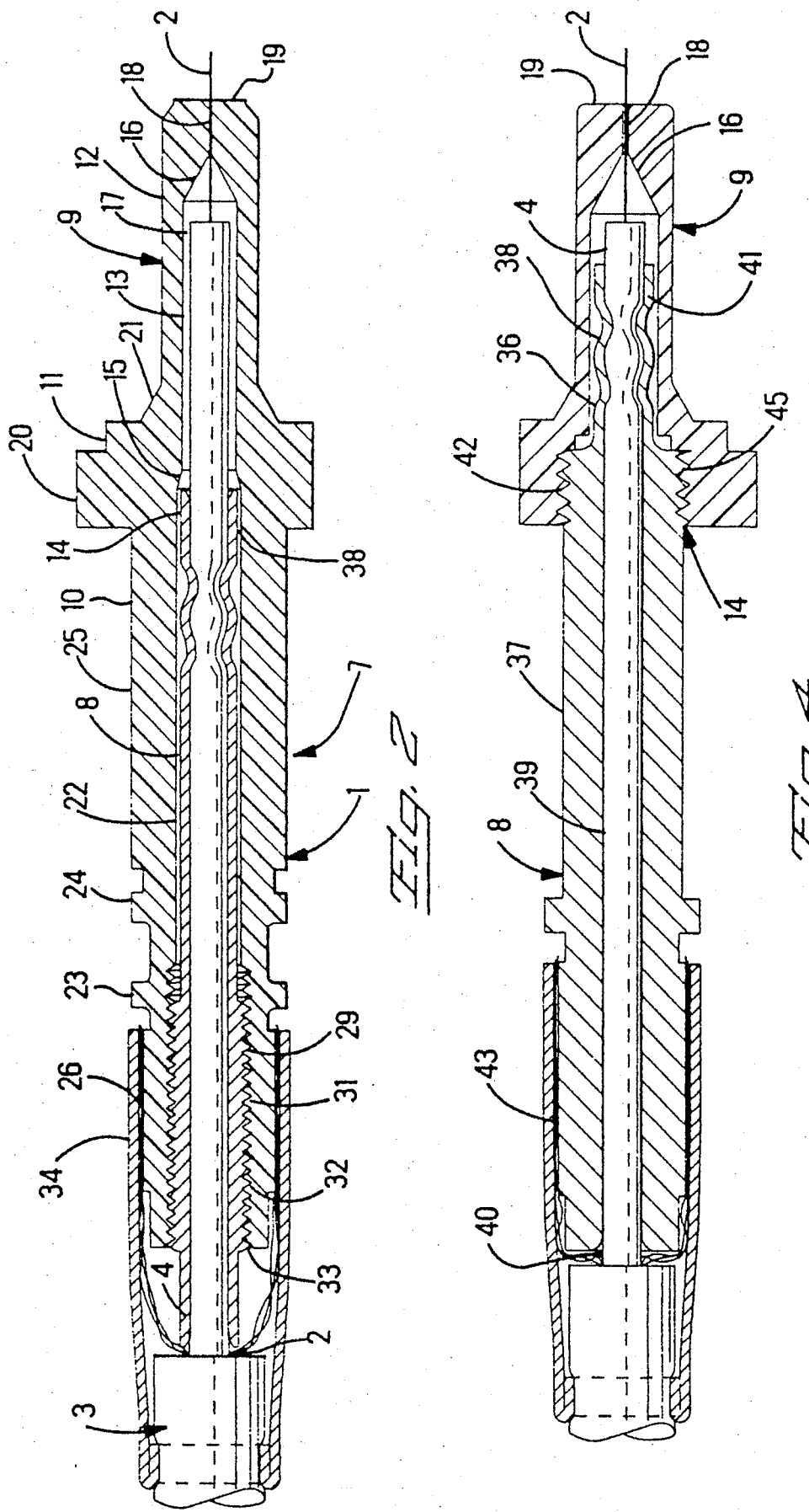

THREADED CRIMPING BODY FOR FIBER OPTIC TERMINATION

FIELD OF THE INVENTION

This application is a continuation-in-part of pending application Ser. No. 400,303, filed Aug. 29, 1989, pending, and relates to a termination for an optical fiber for interconnecting the fiber to another optical fiber or device. The termination is characterized by a crimping body of deformable material intimately surrounding the optical fiber and having outwardly directed threads for interconnection with threads of an alignment ferrule.

BACKGROUND OF THE INVENTION

Optical fibers include a fiber with a flexible buffer and strength members extending axially of the buffer and an external jacket. These fibers may be interconnected one to the other or to other optical devices by terminating the fiber within a connecting body having an alignment ferrule and a tip. The termination must permit accurate axial alignment of the light conducting fiber of the connection. Toward this end, optical fiber terminations often include a precision means to provide axial alignment and clamping or gripping means to prevent longitudinal movement of the fiber within the connector body. The present invention is a termination for an optical fiber which includes a connector and which provides axial alignment and means to prevent longitudinal movement as provided by a single body.

SUMMARY OF THE INVENTION

An object of the present invention is to provide a termination for optical fibers which is simple and inexpensive to construct and which achieves precise axial alignment and prevents longitudinal movement. It is further an object to provide a termination which can be constructed without the need of special tools and without adhesives.

The present invention is a termination for optical members comprising an alignment ferrule and an optical fiber member. The optical fiber member has a flexible buffer and fiber. The alignment ferrule has tubular passageway for encircling the optical member and comprises an elongated sleeve body and a tip with centrally disposed aperture therethrough for closely receiving an end of the fiber from the tubular passageway. The termination further comprises a crimping body of deformable material, intimately surrounding the flexible buffer and fiber and attached by crimping thereto and characterized by having outwardly directed threads for interconnection with threads of the alignment ferrule.

A termination for optical members comprises a connector and an optical fiber member having flexible buffer and optical fiber wherein the connector comprises an alignment ferrule having tubular passageway for encircling the flexible buffer and optical fiber, and a tip with centrally disposed aperture therethrough for closely receiving an end of the fiber from the tubular passageway and a crimping body of deformable material intimately surrounding the flexible buffer and fiber and attached by crimping thereto. The termination is characterized in that the crimping body, together with the buffer and fiber, is engaged by compression fit within the tubular passageway and against the walls of the passageway of the alignment ferrule.

With the present invention, the tubular passageway of the alignment ferrule has a connection section with inwardly directed threads and the crimping body has a connection section with outwardly directed threads engaged with the inwardly directed threads of the connection section of the ferrule.

Intimate crimping of the body to the optical member permits prefabrication at a manufacturing site, and transportation of the combined crimping body and optical member for connection as an integral piece at a connection location.

Other advantages and aspects of the invention are apparent by way of example from the detailed description that follows and from the accompanying drawings.

DESCRIPTION OF THE DRAWINGS

FIG. 2 is an enlarged section view through the termination of FIG. 1.

FIG. 4 is an enlarged section view through the termination of FIG. 3.

DETAILED DESCRIPTION OF THE INVENTION

Figure 1:
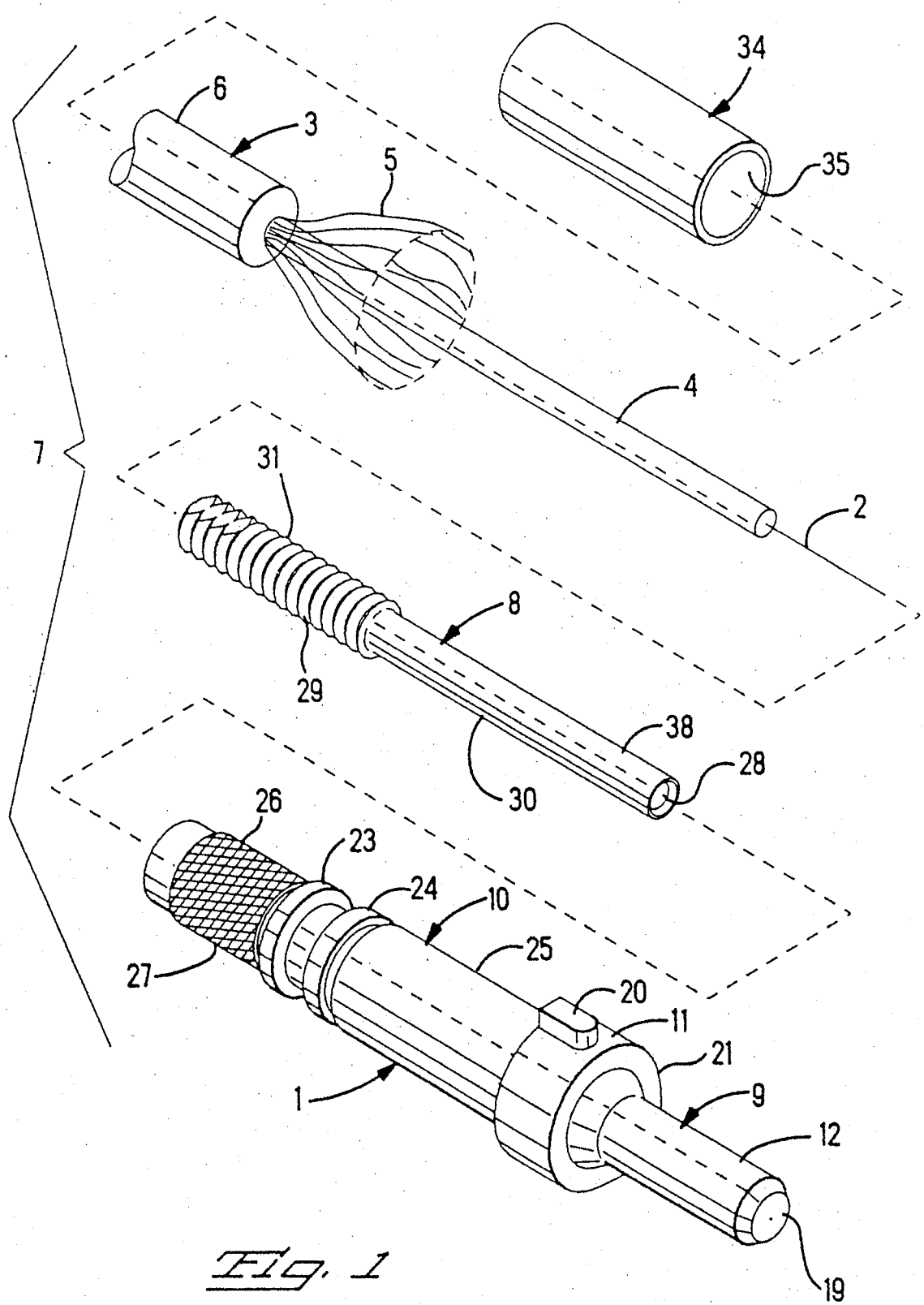
FIG. 1 is a fragmentary perspective view of the preferred embodiment of the termination for optical members.

With reference to FIGS. 1 and 2, is shown in alignment ferrule 1 for an optical fiber 2 of an optical fiber cable 3. The cable 3 is of known construction and includes a flexible buffer 4, concentrically encircling the fiber 2, multiple strands of strength members 5 extending axially of the buffer 4 and distributed around the periphery of the buffer 4, and an external jacket 6. Termination 7 includes connector 1, optical fiber 2 and buffer 4, and crimping body 8. The connector 1 consists of a single, unitary piece having two parts; a tip 9, and an elongated sleeve body 10. The tip 9 has flange portion 11 and nose portion 12. The tip 9 may be made of a hard, metal material, such as brass, or a deformable material, such as a thermoplastic. The tip 9 has a profile through passage 13 with entry section 14 and truncated, conical surface 15 leading to exit passage 16. Profile axial bore 17 is aligned with exit passage 16, leading to narrow exit bore 18 at front mating surface 19. In FIGS. 1 and 2, the outside of the tip 9 is profiled by key 20 and tapered surface 21 between flange 11 and nose 12.

Elongated sleeve body 10 has a through passage 22 extending through the body 10, and further, has flanges 23 and 24 at its rearward end, and barrel-shaped front 25 and rear 26 portions, with rear portion 26 having a knurled surface 27.

It is notable that the ferrule 1 is shown as a single piece, but may be a bipartite body consisting of a separate sleeve body 10 and tip 9 attached by threading the body together or connection by ultrasonics or heating or by adhesive or mechanical means.

Crimping body 8 is in the form of a sleeve with axial central passageway 28, and connection section 29, crimping section 30 and end 38. Connection section 29 is characterized by outwardly directed threads 31 for engagement with inwardly directed threads 32 located at the internal entry portion 33 of the through passage 22 of ferrule 9 as hereinafter described. Crimping body 8 is of a relatively soft, deformable material which may be compressed or pinched by means of a crimping or swaging tool into intimate contact with the buffer 4 of the optical fiber cable 3.

Sleeve 34 has through passage 35 of a diameter so that it forms a close fit over the rear barrel section 26 of ferrule 1 at knurled surface 27 as hereinafter described.

The present invention is utilized with a standard optical fiber cable 3 by first preparing the cable 3 in known fashion to expose a section of the fiber buffer 4 and fiber 2. The fiber 2 and the buffer portion 4 are passed through the axial central passageway 28 of the crimping body 8 from rear to front until fully inserted with the forward end of the buffer 4 and fiber 2 extending slightly beyond the forward end of the crimping body 8 with strength members 5 positioned outside the crimping body 8. A conventional crimping tool is positioned onto the crimping body 8 at crimping section 30 and the tool controllably operated to crimp section 30 onto the buffer 4 of the stripped fiber cable.

The resulting assembly of buffer 4 and fiber 2 and crimping body 8 is then inserted into ferrule 1 from rear 26 to the front 25 until the assembly of buffer 4, fiber 2 and crimping body 8 begins to enter central passageway 13 within nose portion 11 and outwardly directed threads 31 of connection section 29 commence to engage with inwardly directed threads 32 at internal entry portion 33 of ferrule rear portion 26. As the crimping body 8 is threaded further into ferrule 1, strength members 5 are distributed along the knurled surface 27 of rear portion 26. The fiber 2 passes through passage 22 and exit bore 18 of tip 9 to extend through and beyond the face 19 of the tip 9. The forward end of the buffer 4 and fiber 2 extend slightly beyond the end 38 of the crimping body 8. As this insertion is accomplished, the assembly of crimping body 8 and buffer 4 and fiber 2 is locked within elongated sleeve body 10. Further, sleeve 34 is fitted axially around ferrule 1 at knurled surface 27 entrapping strength members 5 of crimping body 8. Knurling 27 provides increased friction to retain the sleeve 34 in place as a compression fit around ferrule 1 to further secure strength members 5. With the locking connection of the strength members 5, the body 8 and buffer 4 and fiber 2 is prevented from backing out of ferrule 1. Further, the termination 7 is insulated from down line agitation which would adversely affect the connection of the fiber 2 at the face 19 of tip 9.

Figure 3:
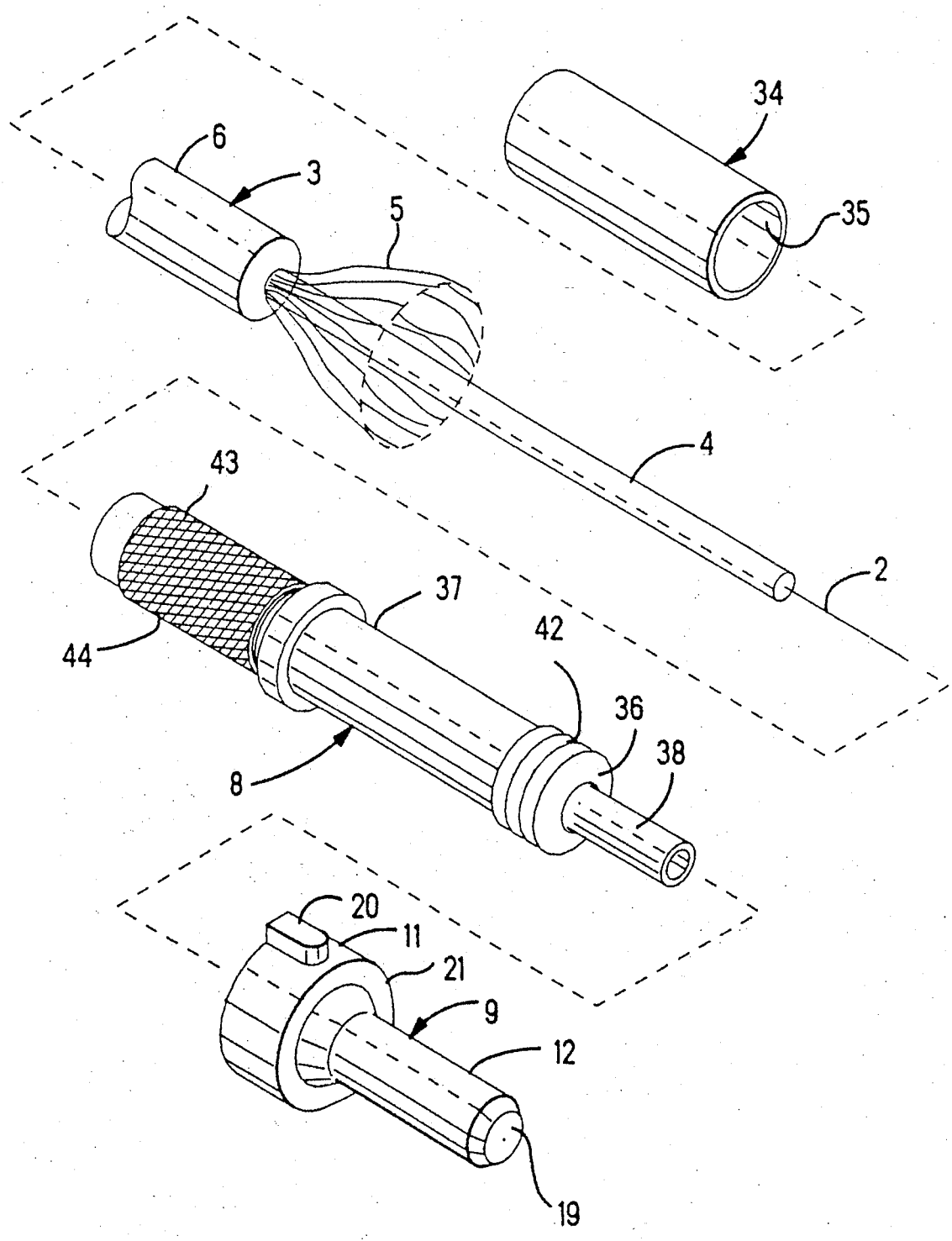
FIG. 3 is a fragmentary perspective view of another embodiment of the termination of the present invention.

Referring to FIGS. 3 and 4 is shown another embodiment of the present invention wherein the crimping body 8 is attached to ferrule tip 9. In these drawings, like items are identified by the same numbers as in FIGS. 1 and 2.

Crimping body 8 is an elongated sleeve body having three sections—a nose section 36, a central elongated crimping section 37, and a rear section 43. Crimping body 8 also is characterized by through passage 39 extending through and along the longitudinal axis of crimping body 8. Nose section 36 includes crimping tip 38 which, during assembly, acts as a guide for inserted buffer 4 and cable 2 as hereinafter described. The crimping body 8 has a profile through passage 39 with entry section 40, exit passage 41 and outwardly directed threads 42.

Central crimping section 37 is of an elongated shape with through passage 39 and rear section 43 characterized by knurled surface 44. Tip 9 is as described with reference to FIGS. 1 and 2 but additionally having inwardly directed threads 45 at entry section 14 for connection with threads 42 as hereinafter described.

As with the embodiment of FIGS. 1 and 2, the embodiment of FIGS. 3 and 4 is utilized with a standard optical fiber cable 3 by first preparing the cable 3 in known fashion to expose a section of the fiber buffer 4 and fiber 2. The fiber 2 and the buffer portion 4 are passed through the axial passageway 39 of the crimping body from rear to front until fully inserted through the passage 39 and out the exit passage 41 of the tip 38 of the crimping body 8 with strength members 5 positioned outside the crimping body 8 immediately around the knurled rear section 44. A conventional crimping tool is positioned onto the crimping body at crimping section 38 and the tool controllably operated to crimp this section onto the buffer 4 of the stripped fiber cable. This assembly of buffer 4 and fiber 2 and crimping body 8 is then inserted into the profile through passage of tip 9 at entry section 13 until crimp tip 38 rests within tip 9 and outwardly directed threads 42 begin to engage with the inwardly directed threads 45 of ferrule tip 9. The combination of buffer 4, fiber 2 and crimping body 8 is then threaded onto tip 9 until fiber 2 extends through the through passageway 13 and through profile axial bore 17 and exit passage 16 and through narrow bore 18 to extend beyond front mating surface 19. Further, sleeve 34 is drawn toward the rear end of crimping body 8 until strength members 5 of the cable 3 are captured by the fit between sleeve 34 and knurling 44. The section between these surfaces retains the strength members and locks the cable 3 to further prevent the buffer 4 and fiber 2 from backing out of body 8.

We claim:

1. A termination for optical members comprising an alignment ferrule and an optical member having buffer and optical fiber wherein the alignment ferrule comprises an elongated sleeve body and has tubular passageway for encircling the buffer and optical fiber, and a tip with centrally disposed aperture therethrough for closely receiving an end of the fiber from the tubular passageway wherein;

the tubular passageway of the alignment ferrule has a connection section with inwardly directed threads and further comprising a crimping body of deformable material intimately surrounding the flexible buffer and fiber, the crimping body having a connection section with outwardly directed threads engaged with the inwardly directed threads of the passageway.

2. The termination of claim 1 comprising a crimping body having a tubular shaped portion and a rear connection portion with outwardly directed threads engaged with the outwardly directed threads of the crimping body.

3. The termination of claim 1 wherein the alignment ferrule is a bipartite body comprising the elongated sleeve body and the tip having profile through passage, the elongated sleeve body having inwardly directed threads and engaged with the outwardly directed threads of the crimping body.

4. The termination of claim 1 wherein; the tip having centrally disposed aperture is characterized by inwardly directed threads, engaged with the outwardly directed threads of the connection section of the crimping body.

5. The termination of claim 4 wherein the crimping body is characterized by a nose with connection section with outwardly directed threads positioned immediately adjacent to the nose so that the nose nests within the nose of the tip as the outwardly directed threads of the connection section are engaged with the inwardly directed threads of the connection section of the nose.

* * * * *